L. C. JONES.
PROCESS OF FORMING AMMONIA AND AIR MIXTURE.
APPLICATION FILED AUG. 1, 1918.
1,307,739.  Patented June 24, 1919.
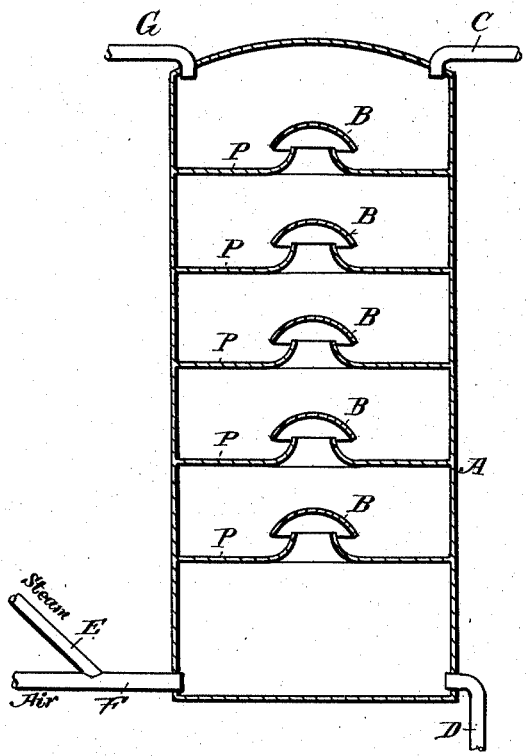

UNITED STATES PATENT OFFICE.

LOUIS C. JONES, OF SYRACUSE, NEW YORK, ASSIGNOR TO SEMET-SOLVAY COMPANY, OF SOLVAY, NEW YORK, A CORPORATION OF NEW YORK.

PROCESS OF FORMING AMMONIA-AND-AIR MIXTURE.

1,307,739.      Specification of Letters Patent.      Patented June 24, 1919.

Application filed August 1, 1918. Serial No. 247,887.

*To all whom it may concern:*

Be it known that I, LOUIS C. JONES, a citizen of the United States, residing at Syracuse, in the county of Onondaga and State of New York, have invented a new and Improved Process of Forming Ammonia-and-Air Mixture, of which the following is a specification.

My invention relates to the production of a mixture of ammonia and atmospheric air, such as is employed in the oxidation of ammonia in the process of making nitric acid.

Usually this has been effected by passing air through a meter and into it ammonia gas through another meter at such speeds as to secure the desired mixture.

It has also been proposed, since the form of ammonia best suited commercially for oxidation into nitric acid is its solution in water, to effect the desired mixture by passing air through a solution of ammonia in water and my process involves generally this method of procedure, the object of my improvements being to avoid waste of ammonia by completely robbing the solution of its ammonia content and to provide a uniform mixture of ammonia and air in the desired proportions.

In carrying my invention into effect a current of heated air is caused to bubble up through a stream of strong ammonia liquor flowing against the air current.

Thus the air is charged with ammonia and by regulating the strength of the ammonia liquor supplied and the temperature of the air admitted thereto, not only can a definite and uniform mixture of air and ammonia be produced but the ammonia can be practically completely removed from the solution thus avoiding any loss of ammonia in the waste.

In the accompanying drawing I have shown in diagrammatic form an apparatus which may be employed in practising the invention by reference to which it will be best understood.

Referring to the drawing, A, indicates a wash tower which is divided into a number of pans or compartments having openings provided with hoods, B, B, B, so as to provide a water seal between each compartment and the one next above it. Ammonia liquor is admitted to the top of the tower, A, through pipe, C, and flows downward through the tower, overflowing from one to another of the pans, B, and finally after having been freed from its ammonia content passes out from the bottom of the tower through a pipe, D.

Air, preheated as by the admission thereto of steam through pipe, E, or in other suitable manner, is admitted to the bottom of the tower, A, through pipe, F, and passes upward through the tower, bubbling through the liquor in the several pans from under the hoods, B. In its passage through the ammonia liquor the air becomes charged with ammonia and the mixture of air and ammonia passes out from the uppermost compartment through pipe G.

By maintaining the air entering the bottom of the tower, A, at a proper temperature practically all the ammonia is swept from the solution in the lowest compartment so that there is no loss of ammonia in the waste, thus making it unnecessary to recover weak ammonia from the apparatus or to reconcentrate. Ordinarily the vaporization of the ammonia from the top compartment automatically cools the liquor in the top compartment to about the temperature required to give the desired percentage of ammonia air mixture when feeding the apparatus with concentrated ammonia liquor. Artificial cooling may be resorted to if desired to reduce to a minimum the amount of water carried by the ammonia-air mixture though in practive I have not found this necessary.

Under normal conditions of operation I have obtained satisfactory results when ammonia liquor containing approximately 25 per cent. of ammonium enters the apparatus at the top, while air enters the bottom at such a temperature as to maintain the liquid in the lowermost compartment at approximately 60° C.

By passing the air and the solution in counter-current through about five compartments under these conditions of strength of solution and temperature the water passing out at the bottom contains less than .3 gram per liter ammonia, while the air leaving the top compartment at 25° C. contains approximately 9.5 per cent, ammonia.

By changing the temperature of the entering air, or the rate of flow, concentration or temperature of the entering ammonia liquor, corresponding variations can be made in the ammonia mixture and at the same time a negligible amount of ammonia be lost in the waste.

Having thus described my invention what I claim as new and desire to secure by Letters Patent is:—

1. The process of forming a mixture of ammonia and air which consists in causing preheated air to bubble up through a counter-current of ammonia solution.

2. The process of forming a mixture of ammonia and air which consists in causing preheated air to bubble up through a counter-current of ammonia solution and regulating the strength of the mixture by varying the initial strength of the solution in ammonia.

3. The process of forming a mixture of ammonia and air which consists in causing preheated air to bubble up through a counter-current of ammonia solution and regulating the strength of the mixture by varying the solution conditions at the point where the air passes therefrom.

In testimony whereof I have affixed my signature this 22nd day of July, 1918.

LOUIS C. JONES.